3,728,212
HOT MELT ADHESIVE OF POLY(TETRAMETHYL-
ENE)TEREPHTHALATE AND POLYSTYRENE OR
POLYSTYRENE COPOLYMERS
John R. Caldwell and Winston J. Jackson, Jr., Kingsport,
Tenn., assignors to Eastman Kodak Company, Rochester, N.Y.
No Drawing. Continuation-in-part of applications Ser. No.
11,033, Feb. 12, 1970, and Ser. No. 11,890, Feb. 16,
1970, which is a continuation-in-part of application
Ser. No. 671,940, Oct. 2, 1967, now abandoned. This
application Mar. 23, 1971, Ser. No. 127,333
Int. Cl. B32b 9/04; C08g 39/10
U.S. Cl. 161—182                10 Claims

ABSTRACT OF THE DISCLOSURE

Improved hot melt adhesives comprising a poly(tetramethylene terephthalate) polyester having an inherent viscosity of at least about 0.8, blended with a vinyl polymer selected from polystyrene and polystyrene copolymers and articles secured therewith.

---

This application is a continuation-in-part of copending applications Ser. Nos. 11,033, filed Feb. 12, 1970, titled "Hot Melt Adhesive Polymer Blends" now U.S. 3,657,382, and 11,890, filed Feb. 16, 1970, titled "Hot Melt Adhesive Polymer Blends" now abandoned, which are continuation-in-part applications based on Ser. No. 671,940, filed Oct. 2, 1967, titled "Hot Melt Adhesive Polymer Blends," and now abandoned.

This invention relates to hot melt adhesives. More specifically, this invention relates to hot melt adhesive compositions which consist of a blend of poly(tetramethylene terephthalate) with polystyrene or a polystyrene copolymer.

Compared to other types of adhesives, hot melt adhesives are of importance because of their speed of application. No solvents must evaporate and no curing must take place, and strong adhesive bonds are obtained as soon as the adhesive cools. Polyesters have been found useful in hot melt adhesives; however, many such polyesters have low adhesive strength, particularly peel strength, on various substrates such as aluminum, copper, steel, glass, etc., and on substrates coated with various materials, such as polyepoxide resins, vinyl, phenolics, alkyds, acrylics, etc. Another problem often encountered is that many polyesters have been found to be lacking in the ability to maintain high adhesive strength after aging as well as the ability to maintain high bond strength under relatively high temperature conditions. Moreover, many polyesters, particularly crystalline high melting polyesters, have inferior flowing and wetting properties and, therefore, must be applied at relatively high temperature when used as hot melt adhesives.

It is therefore, a principal object of this invention to provide hot melt adhesives with improved adhesion to various types of substrates.

A further object is to provide a hot melt adhesive composition with improved processability as hot melt adhesives.

A still further object is to provide a hot melt adhesive composition capable of maintaining high adhesive strength upon aging and the ability to maintain high bond strengths under relatively high temperature conditions.

A still further object is to provide laminated articles consisting of various substrates bonded with these compositions.

Another object of this invention is to provide a polyester hot melt adhesive derived from a blend of poly(tetramethylene terephthalate) and polystyrene or a polystyrene copolymer.

Other objects are apparent elsewhere in this specification.

These objects have been obtained in accordance with the present invention through the discovery that certain blends of poly(tetramethylene terephthalate) with polystyrene or a polystyrene copolymer unexpectedly give greatly improved adhesion, processability and exhibit outstanding bond strength under high temperature conditions as well as the ability to maintain high adhesion strength bonds upon aging. The polyester component comprises from about 70 to 95 percent of the blend, and preferably from 80 to 90 percent. The polyester component must have an inherent viscosity of at least about 0.8 and preferably about 1.0.

Blends of polyesters with certain vinyl polymers are described in U.S. 3,290,411, British 1,052,863, and British 1,066,061. These patents describe methods of making blends principally with styrene polymers and conversion of the blends into fibers. The recognition of the melt adhesive characteristics and resulting laminates are however, entirely lacking in these disclosures. British Pat. 861,835 discloses copolyester-based adhesive compositions. These compositions exhibit much lower melting points than the instant invention as well as degrees of crystallinity and, consequently, have very low adhesive strength at 120° C.

According to one aspect of this invention, there is provided a hot melt adhesive composition comprising from about 70 to about 95 percent by weight of a polyester of 1,4-butanediol and terephthalic acid or a condensable derivative thereof, said polyester having an inherent viscosity of at least about 0.8, as measured at 25° C. using 0.25 gram of polyester per 100 ml. of a solvent consisting of 60 percent by weight phenol and 40 percent by weight tetrachloroethane, and from 5 to about 30 percent by weight of a vinyl polymer selected from the group consisting of polystyrene and copolymers of about 70 to 99 weight percent styrene and about 1 to 30 weight percent of at least one other copolymerizable olefinc monomer.

In an especially preferred embodiment of the invention there is provided a hot melt adhesive composition comprising the blend defined above except that the polyester component comprises from 80 to 90 percent by weight of the blend. The polystyrene polymer or polystyrene copolymer may have an inherent viscosity of at least 0.1 and preferably at least about 0.5. About 30 weight percent of the polystyrene polymer may be used; preferably however, 10 to 20 weight percent may be used.

The polyester component of this invention may be prepared by standard procedures well known to those skilled in the art. See for example British Pat. 1,047,072. For example, these copolyesters may be prepared by employing such amounts of terephthalic acid and 1,4-butandiol according to such polymerization conditions as will result in the production of a polyester in which the inherent viscosity will be at least 0.8. It has been found suprisingly that blends in which the polyetser material has an inherent viscosity of at least about 0.8 have superior adhesive strength in laminating various materials and substrates as revealed by the so-called "Peel Test," the details of which are described hereinafter. As indicated above, the polyesters of this invention are prepared by conventional techniques, preferably by ester interchange of glycol and dialkyl esters of the dicarboxylic acid, i.e., terephthalic acid.

The preferred vinyl constituent of the invention is polystyrene; however, the polystyrene may contain up to 30 weight percent of one or more olefinic copolymerizable components such as α-methylstyrene, acrylonitrile, butadiene, methyl acrylate, methyl methacrylate, vinyl acetate, vinyl pyridine, vinyl carbazole and the like. As indicated above, the polystyrene polymer has an I.V. of at least 0.1 and preferably at least 0.5. The polystyrene polymers and copolymers are prepared by conventional procedures from the corresponding monomers.

Blending of the poly(tetramethylene terephthalate) with the polystyrene or polystyrene copolymer may be carried out by various common procedures, including mechanical mixing of the particles, blending on hot rolls, mixing in the melt, or mixing in solution and then removing the solvent. In some situations, it is desirable to heat the mixture to attain solution and chlorinated diphenyls or terphenyl containing from 30 to 60 percent chlorine are suitable for use as solvent. After solution is attained, the solvent is removed by distillation under reduced pressure, and the last traces are removed by extraction.

Substances which may be laminated by the adhesives of this invention include paper, cardboard, metals (such as steel, iron, aluminum, chromium, copper, brass, bronze nickel, zinc, titanium and tin), wood, glass ceramic materials and fabrics. Substrates coated with polyepoxide resin, epoxy phenolic resin, melamine resin, phenolic resin, alkyd resin, a vinyl or an acrylic coating may also be laminated with the blends of this invention. The same or different materials may be laminated in one structure. It is generally advisable to clean the surfaces of the components to be laminated just prior to formation of the melt adhesive bond to remove foreign matter, grease, oxide coatings, etc. which might interfere with the formation of strong bonds. The hot melt adhesive of this invention may be applied in molten form with a spatula or regular extrusion equipment to the surfaces of the component to be laminated or a film of the polyester (2 to 6 mils in thickness) may be placed between the surfaces. After application of the polyester, the surfaces may be clamped together with a pressure of several pounds per square inch and heat applied by placing the clamped structure in a forced air oven at a temperature of about 260° C. A convenient way of bonding metal test strips for peel tests is to heat them together on a hot plate while rubbing back and forth with a wooden spatula. No additional pressure is necessary. A glue line (adhesive thickness) of 3 to 5 mils is satisfactory.

Fillers, pigments, and glass cloth may be incorporated in the adhesive composition to increase the bonding strength and temperature resistance. Fillers and pigments such as very finely divided silica, alumina, or calcium carbonate may also affect the crystallinity and the size of the crystallites. From 1 to 30 percent by weight may be added. Antioxidants and stabilizers also may be incorporated into the polymer blend to improve the thermal and oxidative stability at elevated temperatures.

This invention may be more fully understood by a reference to the following illustrative examples which are intended to describe certain embodiments of this invention. Parts and percentages are by weight and temperatures are in degrees centigratde unless otherwise specified. All inherent viscosities (I.V.) are determined at 25° C. using 0.25 gram of polymer per 100 ml. of a solvent consisting of 60 percent by weight phenol and 40 percent by weight tetrachloroethane.

Poly(tetramethylene terephthalate) is prepared by conventional procedures from dimethyl terephthalate and 1,4-butanediol. The polystyrene polymers are prepared by conventional procedures from the corresponding monomers.

The polyester and polystyrene (or polystyrene copolymer) are granulated to pass a 20-mesh screen, mixed together to give the desired blend, dried in a vacuum oven at 80° C., melt blended by extruding in a screw fed extruder, and then granulated to pass a 20-mesh screen for use in adhesive bond formation.

SPECIMEN PREPARATION AND TESTING

The adhesive tests are carried out with 12-mil aluminum (type 1100; mill finish; masked) and 6.5-mil chrome-coated steel can stock (55 gauge; 3 mg. chromium/sq. ft.). The metal sheets are cut to give 1" x 5" specimens for T-peel and tensile shear tests.

To remove the last traces of the protective paper masking material on the aluminum, the specimens are heated in acetic acid at 80° C. for 1 hour, then rinsed in distilled water, sprayed with acetone and air dried. The chrome-coated steel specimens are washed three times with a solution of Alconox detergent (Alconox, Inc.), rinsed in water each time, sprayed with acetone, and air dried.

The T-peel strengths are measured on an Instron tensile tester in accordance with ASTM D–1876–69 but using the precut specimens and an average of three tests. A specimen is heated sufficiently on a hot plate for the polyester to melt (applied as 20-mesh particles). A hot plate temperature of 280° C. is used for the poly(tetramethylene terephthalate) blends and 300° C. is required for the poly(ethylene terephthalate). After the molten polymer is evenly spread on the specimen over a 2 in. length with a wooden spatula, the top piece of metal is pressed against the sample. The sample is then turned over on the hot plate with the second metal strip against the hot plate surface. Heating is continued while the wooden spatula is rubbed back and forth over the adhesive area until a smooth, even glue line is obtained (about 30 sec.). Then the specimen is placed on the laboratory bench and rubbing continued for about 20 sec. longer while the adhesive cools. This method of forming the adhesive bonds gives reproducible results similar to those obtained by clamping the specimens together and heating in a forced-air oven 20 to 50° C. above the polymer melting point. Glue lines are above 3 to 5 mils in thickness.

For tensile shear tests, the adhesive bonds are prepared by the same general procedures as described above except that there is a 0.25-inch overlap between the metal strips. The tensile shear strengths are measured with an Instron tensile tester by the general method of ASTM D–1002–64 except that precut specimens are used and an average of three tests is taken.

Table 1 illustrates the effects of polyester I.V. on the T-peel strength on aluminum at 23° C. of blends of poly(tetramethylene terephthalate) with various amounts of polystyrene (I.V. 0.72), the percentages being based on the total weight of polyester and polystyrene.

TABLE 1

| Example | Polyester, I.V. | Polystyrene, wt. percent | T-peel strength on aluminum, lb./in. width |
|---|---|---|---|
| A | | 100 | 0.7 |
| 1 | 0.66 | 0 | 3 |
| 2 | 0.66 | 15 | 5 |
| 3 | 0.80 | 0 | 4 |
| 4 | 0.80 | 15 | 15 |
| 5 | 1.02 | 0 | 7 |
| 6 | 1.02 | 5 | 13 |
| 7 | 1.02 | 15 | 24 |
| 8 | 1.02 | 25 | 20 |
| 9 | 1.15 | 0 | 7 |
| 10 | 1.15 | 5 | 15 |
| 11 | 1.15 | 15 | 25 |
| 12 | 1.15 | 25 | 20 |
| 13 | 1.15 | 35 | 16 |

These data show that the I.V. has only a small effect on the T-peel strength when the adhesive consists of poly(tetramethylene terephthalate) alone; that is, the peel strength increases only from 3 to 7 lbs./in. width when the polyester I.V. is increased from 0.66 to 1.15 (Examples 1, 3, 5, 9). When 15% polystyrene is also present, the peel strength increases only slightly when the polyester I.V. is 0.66 (Example 2) and appreciably more when the polyester I.V. is at least about 0.8 (Examples 4, 7, 11).

The synergistic effect between the polystyrene and poly(tetramethylene terephthalate) is shown by the T-peel value obtained for 100 percent polystyrene, i.e., 0.7, and the T-peel value for 100 percent poly(tetramethylene terephthalate), i.e., 3, 4, 7 and 7 (Examples 1, 3, 5 and 9) as compared to the blends of the two components. Especially significant and unexpectedly superior results are obtained when the poly(tetramethylene terephthalate) has an I.V. of at least 0.8 (Examples 4, 7, 11).

Table 2 illustrates the effects on the T-peel strength on aluminum at 23° C. of (A) the I.V. of the polystyrene, including copolymers, and (B) the composition of polystyrene or polystyrene copolymer. The compositions include 85 wt. percent of poly(tetramethylene terephthalate) (I.V. 1.15) except for the control which is 100% of the latter polyester.

TABLE 2

| Example | Polystyrene polymer or copolymer Comonomer | I.V. | Amt., wt. percent | T-peel strength on aluminum, lb./in. width |
|---|---|---|---|---|
| Control | | | 0 | 7 |
| 14 | None | 0.10 | 15 | 16 |
| 15 | do | 0.28 | 15 | 16 |
| 16 | do | 0.58 | 15 | 24 |
| 17 | do | 0.72 | 15 | 25 |
| 18 | 10 wt. percent acrylonitrile | 0.65 | 15 | 20 |
| 19 | 12 wt. percent S-methylstyrene | 0.56 | 15 | 22 |
| 20 | 20 wt. percent butadiene | 0.81 | 15 | 19 |
| 21 | 5 wt. percent methyl acrylate | 0.52 | 15 | 23 |
| 22 | 15 wt. percent vinyl acetate | 0.73 | 15 | 18 |

These data show that a significant improvement in peel strength is obtained even with an I.V. of 0.10, but that better results are obtained with higher I.V.'s. The polystyrene copolymers also are very effective in improving the peel strength.

Table 3 illustrates the increased peel strength which is obtained on chrome-coated steel can stock when polystyrene (I.V. 0.72) is blended with poly(tetramethylene terephthalate) (I.V. 1.15). Also illustrated is the effect of heat on the adhesive strength when the bonded specimens prepared as described above are heated in an oven at 120° C. for 24 hrs. and for 1 week to simulate the effect in a use requiring this temperature or other elevated temperatures. After the heating period the specimens are cooled to 23° C. and tested as described above.

TABLE 3

| | | T-peel strength/chrome coated steel at 23° C., lb./in. width | | |
|---|---|---|---|---|
| Example | Polystyrene, wt. percent | Initial | After 24 hrs., 120° C. | After 1 wk., 120° C. |
| 23 | 0 | 26 | 20 | 11 |
| 24 | 15 | 44 | 42 | 37 |

Note the high peel strength imparted by the polystyrene and the relatively small decrease in peel strength after the heating periods when polystyrene is present.

Table 4 illustrates the effect of heat on the peel strength on chrome-coated steel bonded with a blend of poly(ethylene terephthalate) (I.V. 0.63) with 15 wt. percent of polystyrene (I.V. 0.72). The bonded specimens are heated in an oven at 120° C. for 30 min. and the following data show that the particular polyester used is of great significance.

TABLE 4

| | T-peel strength/chrome coated steel at 23° C., lb./in. width | |
|---|---|---|
| Example | Initial | After 30 mins., 120° C. |
| 25 | 37 | 27 |

The poly(tetramethylene terephthalate) blend of Example 24 shows less decrease in peel strength during 1 week at 120° C. than the poly(ethylene terephthalate) blend of Example 25 shows in 30 min.

Table 5 lists the T-peel and tensile strengths on chrome-coated steel at 120° C. with poly(ethylene terephthalate) (I.V. 1.00), poly(tetramethylene terephthalate) (I.V. 1.15), and blends of each of these polyesters with 15 wt. percent of polystyrene (I.V. 0.72). The specimens are heated to 120° C. and immediately tested.

TABLE 5

| Example | Polyterephthalate | Polystyrene, wt. percent | T-peel strength chrome coated steel at 120° C., lb./in. width | Tensile shear strength at 120° C., p.s.i. |
|---|---|---|---|---|
| 26 | Ethylene | 0 | 27 | 1,100 |
| 27 | do | 15 | 25 | 750 |
| 28 | Tetramethylene | 0 | 22 | 1,350 |
| 29 | do | 15 | 32 | 1,300 |

Polystyrene slightly decreases the peel strength and appreciably decreases the tensile shear strength of poly(ethylene terephthalate) at 120° C. whereas the polystyrene appreciably increases the peel strength and has very little effect on the tensile shear strength of poly(tetramethylene terephthalate) at 120° C.

Since poly(ethylene terephthalate) has a melting point of 250 C. and poly(tetramethylene terephthalate) has a melting point of 224° C., it is surprising that the polystyrene blends of the latter have the higher T-peel and tensile shear strengths at 120° C. (compare Examples 27 and 29).

The invention has been described in detail with particular reference to preferred embodiments thereof, but it will be understood that variations and modifications can be effected within the spirit and scope of the invention.

We claim:

1. A hot melt adhesive composition comprising from about 70 to about 95% by weight of a polyester of 1,4-butanediol and terephthalic acid or an ester forming derivative thereof, said polyester having an inherent viscosity of at least about 0.8, as measured at 25° C. using 0.25 gram of polyester per 100 ml. of a solvent consisting of 60% by weight phenol and 40% by weight tetrachloroethane, and from 5 to about 30% by weight of a vinyl polymer having an inherent viscosity of at least 0.1 selected from the group consisting of polystyrene and copolymers of about 70–99 weight percent styrene and about 1–30 weight percent of at least one other copolymerizable olefinic monomer.

2. The composition of claim 1 wherein the polyester comprises from about 80 to about 90% by weight of the composition.

3. The composition of claim 1 wherein the vinyl polymer component has an inherent viscosity of at least about 0.5.

4. The composition of claim 1 wherein the vinyl polymer component is polystyrene.

5. The composition of claim 1 wherein the vinyl polymer is a copolymer selected from (a) poly(styrene-acrylonitrile),
(b) poly(styrene-α-methyl styrene),
(c) poly(styrene-butadiene),
(d) poly(styrene-methyl acrylate),
(e) poly(styrene-methyl methacrylate),
(f) poly(styrene-vinyl acetate),
(g) poly(styrene-butylene),
(h) poly(styrene-p-chlorostyrene), or a combination of these.

6. The composition of claim 1 wherein the polyester has an inherent viscosity of at least about 1.0.

7. The composition of claim 1 bonded to at least one substrate.

8. The composition of claim 2 bonded to at least one substrate.

9. The composition of claim 3 bonded to at least one substrate.

10. The composition of claim 4 bonded to at least one substrate.

References Cited

UNITED STATES PATENTS

| | | | |
|---|---|---|---|
| 3,515,628 | 6/1970 | Jackson et al. | 161—184 |
| 3,484,339 | 12/1969 | Caldwell | 161—231 |
| 3,505,293 | 4/1970 | Bond et al. | 161—231 |
| 3,532,533 | 10/1970 | Ackerman | 117—47 |

WILLIAM H. SHORT, Primary Examiner

E. WOODBERRY, Assistant Examiner

U.S. Cl. X.R.

117—75, 76, 122 H, 12 A, 1161 K, 161 UZ; 161—194, 203, 214, 216, 232; 260—40, 873